United States Patent
Beard

(10) Patent No.: US 8,032,107 B1
(45) Date of Patent: Oct. 4, 2011

(54) POWER MANAGEMENT BY CONSTANT AWAKE CORRELATOR

(75) Inventor: Paul Beard, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 916 days.

(21) Appl. No.: 10/877,291

(22) Filed: Jun. 24, 2004

Related U.S. Application Data

(60) Provisional application No. 60/483,514, filed on Jun. 26, 2003.

(51) Int. Cl.
*H04B 1/16* (2006.01)

(52) U.S. Cl. ............ 455/343.3; 455/574; 375/149; 375/151; 375/153; 340/7.36

(58) Field of Classification Search .......... 375/140–153, 375/219–223, 316, 329–331; 340/693.1, 340/693.3, 7.36; 455/343.2, 73, 550.1, 572, 455/574, 343.3
See application file for complete search history.

(56) References Cited

U.S. PATENT DOCUMENTS

| | | | | |
|---|---|---|---|---|
| 4,884,284 A * | 11/1989 | Nakayama | ................... | 375/149 |
| 5,016,255 A * | 5/1991 | Dixon et al. | ................... | 375/151 |
| 5,488,662 A * | 1/1996 | Fox et al. | ..................... | 380/34 |
| 5,500,871 A * | 3/1996 | Kato et al. | ................... | 375/146 |
| 5,764,693 A * | 6/1998 | Taylor et al. | ................. | 375/222 |
| 5,999,561 A * | 12/1999 | Naden et al. | ................. | 375/142 |
| 6,366,622 B1 * | 4/2002 | Brown et al. | ................. | 375/322 |
| 2001/0041551 A1 * | 11/2001 | Rotzoll | ........................ | 455/343 |
| 2003/0086481 A1 * | 5/2003 | Sih et al. | ...................... | 375/147 |
| 2003/0119568 A1 * | 6/2003 | Menard | ....................... | 455/572 |
| 2003/0165191 A1 * | 9/2003 | Kokuryo et al. | ............. | 375/231 |
| 2004/0022332 A1 * | 2/2004 | Gupta et al. | ................. | 375/343 |
| 2004/0032825 A1 * | 2/2004 | Halford et al. | ............... | 370/208 |
| 2004/0218699 A1 * | 11/2004 | Carsello | ....................... | 375/343 |
| 2007/0290757 A1 * | 12/2007 | Gilbert et al. | ................ | 330/278 |

* cited by examiner

*Primary Examiner* — Dac Ha
*Assistant Examiner* — James M Perez

(57) ABSTRACT

Disclosed is a circuit for improved power management of a wireless device, comprising an input signal from an antenna, an oscillator, a mixer and a circuit for correlating. In a first analog embodiment of the circuit, the circuit for correlating comprises a surface acoustic wave (SAW) and the circuit further comprises an operational amplifier and a reference voltage. In a second digital embodiment of the circuit, the circuit for correlating comprises a digital correlator and the circuit further comprises a digital comparator.

9 Claims, 3 Drawing Sheets

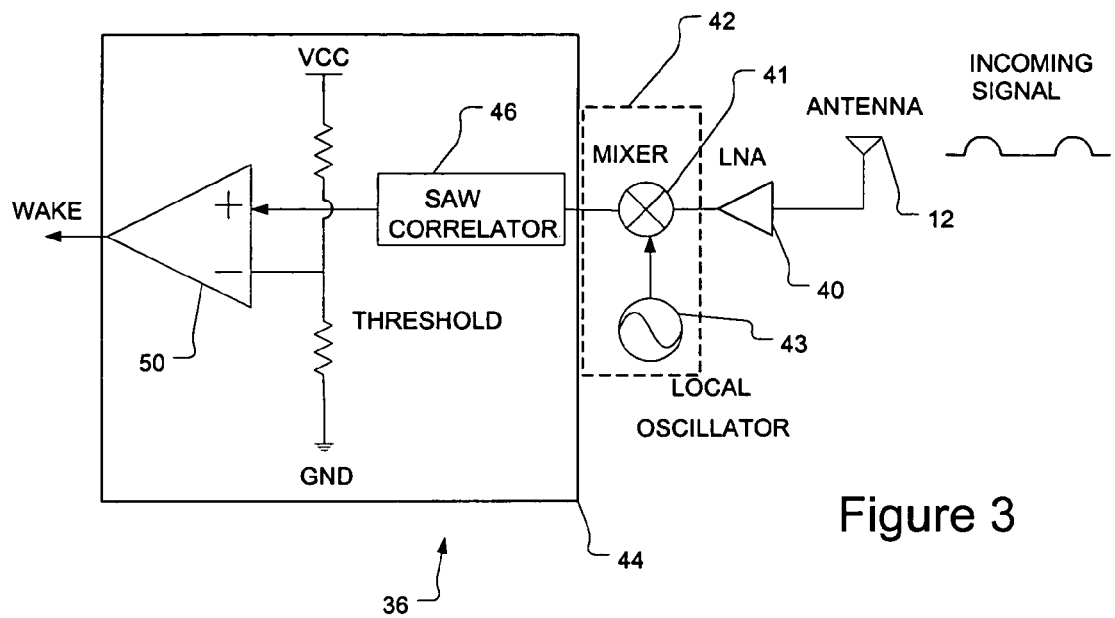
Figure 3
Figure 4
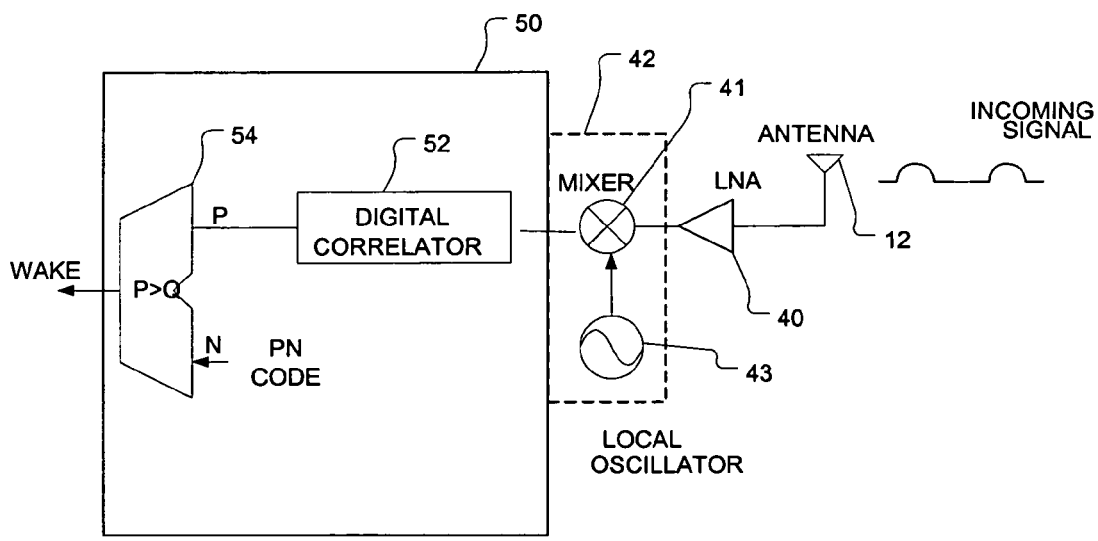

POWER MANAGEMENT BY CONSTANT AWAKE CORRELATOR

This patent application claims priority from U.S. Provisional Application Ser. No. 60/483,514 filed Jun. 26, 2003.

BACKGROUND

1. Field of the Disclosure

The present device relates generally to wireless communication protocols, and in particular to device synchronization operation of such protocols.

2. Background

Wireless connection of devices to computers, and wireless networking of groups of computers is one of fastest growing segments of the electronics industry. Current and emerging technologies in this field include IEEE 802.11 (versions a, b and g) also known as 'WiFi' available at http://standards.ieee.org/catalog/olis/lanman.html, 'Bluetooth' available at https://www.bluetooth.org/ and Cypress Semiconductor's proprietary WirelessUSB standard available at http://www.wirelessusb.org In conventional wireless communication, for two or more devices to communicate, they must first establish a link. The conventional Receiver Signal Strength Indicator (RSSI) technique is commonly used to establish communication between two wireless devices. This technique involves a master device sending a signal to activate a slave device, and a slave waiting for such an activation signal.

Before receiving, the slave is typically in a power-down or sleep mode, and monitors the level of energy on a particular frequency band and performs a magnitude comparison on it. If the magnitude rises above a certain threshold, the slave interprets it as a command to activate itself. The conventional RSSI technique has some disadvantages, as it is prone to false activation, which may cause unnecessary power-up operations and drain battery power over time, resulting in reduced battery life.

It would be desirable to have a technique for establishing communication in a wireless system and powering on a receiving device that is more accurate and less prone to false activation.

SUMMARY OF THE INVENTION

According to an embodiment, a method and apparatus for establishing communication in a wireless system and activating a receiving device is described. One embodiment is a circuit for improved power management of a wireless device, comprising an input signal from an antenna, an oscillator, a mixer and a circuit for correlating.

In a first analog embodiment of the circuit, the circuit for correlating comprises a surface acoustic wave (SAW) and the circuit further comprises an operational amplifier and a reference voltage.

In a second digital embodiment of the circuit, the circuit for correlating comprises a digital correlator and the circuit further comprises a digital comparator.

BRIEF DESCRIPTION OF THE DRAWINGS

FIG. 3 shows an embodiment of an improved analog power management circuit.

FIG. 4 shows an embodiment of an improved digital power management circuit.

DETAILED DESCRIPTION

In a conventional RSSI circuit, a transceiver that wishes to take part in a power-controlled link must be able to measure its own receiver signal strength. It then determines if the transmitter on the other side of the link should increase or decrease its output power level based upon its own receiver signal strength. A RSSI makes this possible.

The power control may be specified as having a golden receive power range. This golden receive power is defined as a range with lower and higher threshold levels and a high limit. The lower threshold level may, in one embodiment, correspond to a received power between −56 dB and 6 dB above the actual sensitivity of the receiver. The upper threshold level may be 20 dB above the lower threshold level with an accuracy of +/−6 dB. The instructions to alter the transmit power may be carried in the medium access layer (MAC).

The RSSI signal may be employed for other reasons. When the transmitter wants to inform the receiver of a need for a particular power range, the signal can be used to 'wake-up' the receiver. This allows the receiver to 'sleep' during times of no communication, saving power and battery life in the device. When the transmitter is getting ready to transmit, it transmits a signal for the RSSI. Generally, there is a portion of the device that is always on that receives the RSSI signal. When the RSSI circuit receives the signal from the transmitter, it can use that signal to power itself up.

Figure 1:
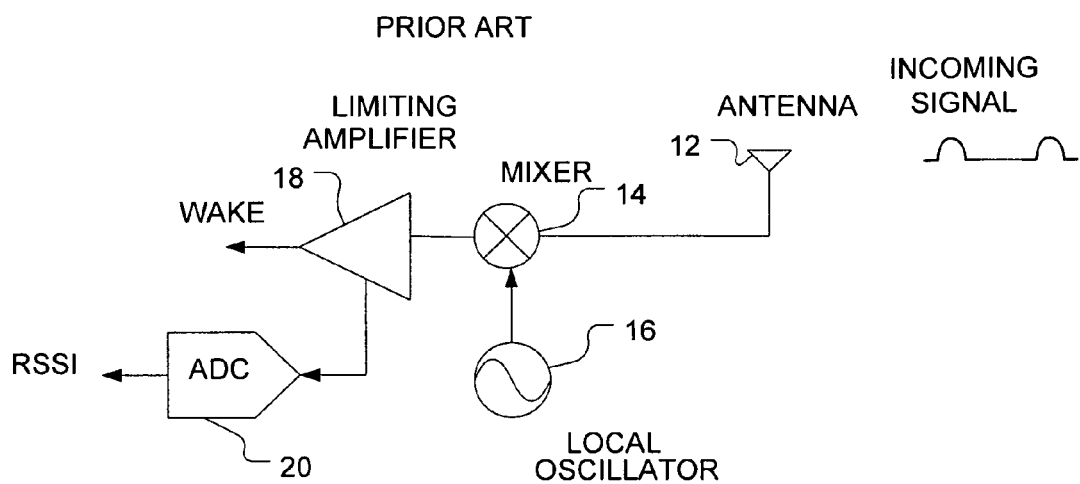
FIG. 1 shows a conventional power management circuit.
Figure 2:
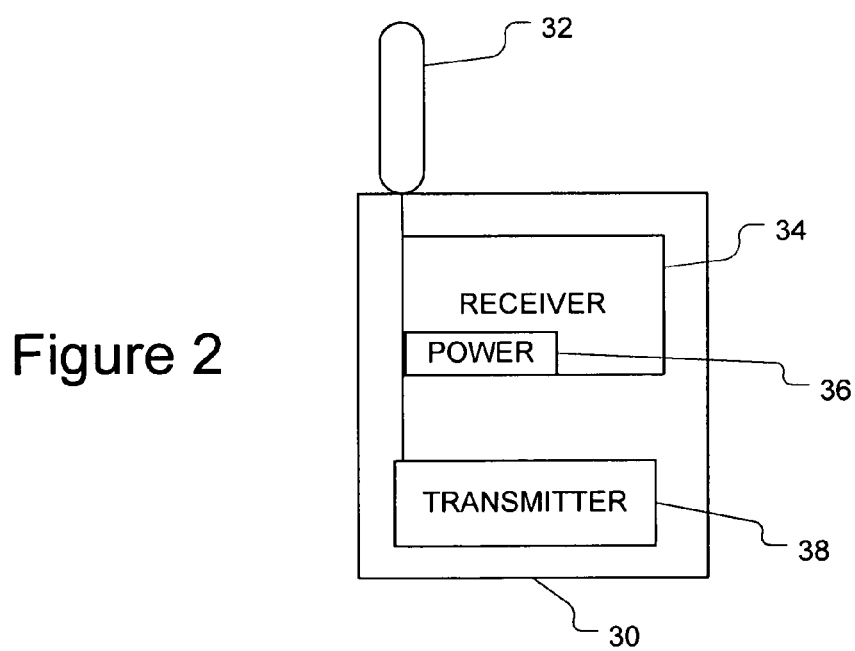
FIG. 2 shows an embodiment of a wireless device using a power management circuit.

A conventional power management circuit is shown in FIG. 1. The antenna 12 receives the modulator carrier wave, which is demodulated by the combination of mixer 14 and oscillator 16. The resulting signal is then input to the limiting amplifier 18. The limiting amplifier determines if the magnitude of the signal rises above a certain threshold, as discussed above. If the signal is above a certain threshold, the power management circuit generates a wake-up signal.

The limiting amplifier also provides an amplified signal to the analog-to-digital converter 20. The analog-to-digital converter then uses the digitized signal as the RSSI signal from the transmitter in accordance with conventional communication practices.

An issue with the current implementations of power management circuit as shown in FIG. 1 is that the limiting amplifier is powered all the time and has a relatively high power requirement. As the power management circuit is directed to conserving power in wireless device, allowing more use time during the battery life, the power consumption of the power management circuit is counterproductive to that goal.

A power management circuit may be used in a wireless device such as 30. The device 30 has an antenna 32 to allow the device to transmit and receive signals. A receiver 34 allows the receiver to receive signals from the antenna and convert them into meaningful signals for a user, such as audible signals, video display signals, etc. A transmitter 38 allows the device to transmit data through the antenna as well.

Generally, the power management circuit 36 is located in the receiver function, as it will need the signals to be demodulated, a function normally performed by the receiver. However, the power management circuit may be located anywhere in the device.

An embodiment of an improved power management circuit 36 is shown in FIG. 3. This particular embodiment is an analog implementation. A digital implementation will be discussed with regard to FIG. 4. It is possible that mixed signal circuits could be used as well.

The incoming signal is received at the antenna 12, passes through the low noise amplifier 40 and demodulated by the demodulation circuit 42. In this particular embodiment, the demodulation circuit is comprised of a local oscillator 43 and a mixer 41. The demodulation circuit then provides its output to a correlation circuit 44. The correlation circuit 44 shown here has surface acoustic wave (SAW) correlator 46. The SAW 46 correlator compares the incoming signal to a waveform it has in memory, and passes the output to the operational amplifier 50 where it is compared against the threshold voltage. If the incoming waveform matches the waveform in memory, then the circuit sends a power-up signal to the rest of the device to activate it. This analog power management circuit has very low power consumption.

The threshold voltage may be provided in several ways. As shown the threshold voltage is provide by a resistor network between a power voltage VCC and ground. The threshold voltage could be provided in many alternative embodiments, this is just intended as an example.

A second embodiment of an improved digital power management circuit is shown in FIG. 4. The antenna 12 receives the incoming signal, which is passed to the low-noise amplifier 40. The low noise amplifier then provides its outputs to the demodulation circuit 42. In this embodiment the demodulation circuit 42 is comprised of a local oscillator 43 and a mixer 41. In this embodiment, the correlation circuit 50 is comprised of a digital correlator 52 and a comparator 54.

The correlator 52 correlates the incoming waveform into a pseudo-noise code. This incoming code is then compared to a pseudo-noise code that it has in memory by the comparator 54. If the result is a match, the output of the comparator 54 generates a wake-up signal for the rest of the device.

In either of the two embodiments, the demodulation circuit was shown as a local oscillator and a mixer. However, these may be replaced with components having a radio frequency input. For example, the SAW of FIG. 3 could be replaced with a SAW having a radio frequency input. Similarly, the digital correlator of FIG. 4 may be replaced with a digital comparator having a radio frequency input.

Figure 5:
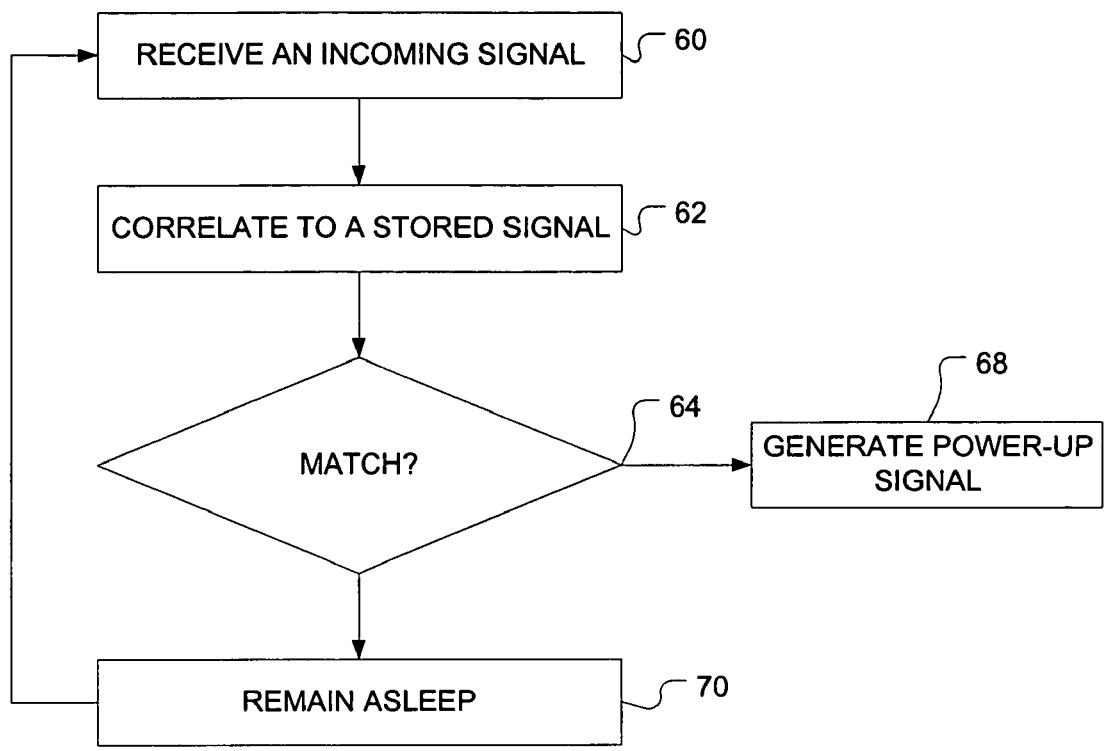
FIG. 5 shows an embodiment of a method of detecting a power-up signal.

In both the first and second embodiments, the wireless device usually remains in low power mode, or asleep, while only the power management circuit is awake and monitoring the incoming signal. This is shown in flowchart form in FIG. 5.

A 'sleeping' device receives an incoming signal at 60. This signal, as it is the first in this communication session, will typically be an RSSI signal sent to both wake-up the receiving device and prepare it for communication with the specification of the power needed.

The incoming signal is then correlated at 62. Correlation will typically also include demodulation, as mentioned above. The correlation is against a signal stored in memory. As discussed above, the signal stored in memory may be a waveform, as in the analog embodiment discussed above. Alternatively, the signal store in memory may be a pseudo-noise code. The correlation process then results in either a match or not at 64.

If there is a match at 64, the power up signal is generated at 68. If there is no match at 64, the device remains asleep at 70. In a worst-case scenario, the signal is valid, but the circuit does not provide a match, not powering up the device. Generally, this will just result in a re-send of the signal from the transmitter, so the net loss is merely a matter of seconds as a second signal is correlated and the device is powered up.

Generally, however, this process will result in a powering up of the device in response to a valid signal 68. The correlation circuit reduces the possibility of false positives, keeping the device asleep for longer periods of time.

This results in considerable power savings that is important for battery operated wireless devices, as it extends the time a user can run on battery power. This is important to many users. The first and second embodiments have advantages over the conventional solution, as they are much less prone to false positives, and thus eliminate unnecessary power-up operations, which may unnecessarily drain power and reduce battery life.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects.

However, this method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Thus, although there has been described to this point a particular embodiment for a method and apparatus for a power management circuit, it is not intended that such specific references be considered as limitations upon the scope of this invention except in-so-far as set forth in the following claims.

What is claimed is:

1. A wireless device, comprising:
    an antenna to allow the device to communicate;
    a receiver to allow the device to receive input data from the antenna;
    a transmitter to allow the device to transmit output data through the antenna; and
    a power management circuit configured to detect the received input data when the receiver and transmitter are in a low power mode and after the receiver and transmitter are powered up, the power management circuit comprising:
        a demodulating circuit operable to demodulate the input data; and
        a correlation circuit operable to receive the demodulated input data from the demodulating circuit, correlate the demodulated input data into a pseudo-noise code and compare the pseudo-noise code to a pseudo-noise code stored in a memory, wherein the correlation circuit comprises a surface acoustic wave (SAW) correlator, the demodulating circuit further comprising a radio frequency input on the correlation circuit.

2. The wireless device of claim 1, the correlation circuit further comprising a comparator and a reference voltage input.

3. The wireless device of claim 1, the wireless device further comprising a wireless device operating under a protocol selected from the group consisting of: Bluetooth, Cypress Wireless USB, and IEEE 802.11a/b/g.

4. A circuit for power management of a wireless device, comprising:
   a demodulating circuit; and
   a correlating circuit coupled to the demodulating circuit and operable to correlate demodulated data received from the demodulating circuit into a pseudo-noise code and compare the pseudo-noise code to a pseudo-noise code stored in a memory, the correlating circuit comprising a surface acoustic wave (SAW) correlator, wherein the wireless device comprises a receiver, and wherein the circuit for power management is configured to detect a received data signal when the receiver is in a low power mode and after the receiver is powered up, the demodulating circuit further comprising a radio frequency input on the correlating circuit.

5. The circuit according to claim 4, the correlating circuit further comprising a comparator and a reference voltage.

6. The circuit of claim 4, the circuit further comprising a low-noise amplifier.

7. The circuit of claim 4, the circuit further comprising an operational amplifier.

8. A method of detecting a power-up signal, comprising:
   receiving an incoming signal through an antenna and receiver of a wireless device while the receiver is in a low power mode;
   demodulating the incoming signal with a demodulating circuit;
   correlating the demodulated incoming signal with a correlation circuit comprising a surface acoustic wave (SAW) correlator, operable to receive the demodulated incoming signal from the demodulating circuit and correlate the incoming signal to a waveform signal stored in memory, wherein the correlation circuit is configured to detect the received incoming signal when the receiver is in the low power mode, the demodulating circuit further comprising a radio frequency input on the correlation circuit; and
   if incoming signal matches waveform signal stored in memory, generating a power-up signal to the device.

9. The method of claim 8, comparing the incoming signal to the pseudo-noise code further comprising using a comparator to compare the incoming signal to the pseudo-noise code stored in memory.

* * * * *